United States Patent [19]

Takahashi

[11] Patent Number: 4,502,097
[45] Date of Patent: Feb. 26, 1985

[54] CONTROL CENTER HAVING CABINET WITH IMPROVED LATERAL STRENGTH AND SAFETY

[75] Inventor: Masaru Takahashi, Gifu, Japan

[73] Assignee: Mitsubishi Denki Kabushiki Kaisha, Tokyo, Japan

[21] Appl. No.: 408,720

[22] Filed: Aug. 16, 1982

[30] Foreign Application Priority Data

Aug. 18, 1981 [JP] Japan .................. 56-128877

[51] Int. Cl.³ .......................................... H02B 1/04
[52] U.S. Cl. .................... 361/342; 361/391; 361/428
[58] Field of Search ............ 361/334, 335, 338, 341, 361/342, 376, 390, 391, 428, 429; 339/17 LM, 17 M, 65, 66

[56] References Cited

U.S. PATENT DOCUMENTS 3,562,593  2/1971  Bould ................... 361/342
3,626,253  12/1971  Sturdivan ............. 361/338
4,178,624  12/1979  Wilson ................. 361/342

Primary Examiner—G. P. Tolin
Attorney, Agent, or Firm—Wenderoth, Lind & Ponack

[57] ABSTRACT

The disclosed control center comprises a cabinet divided into a front and a rear unit compartment by an interposed vertical bus compartment. The unit compartment includes four vertically superposed unit rooms defined by horizontal partition plates, opposite vertical supporting plates and vertical rear plates completely closing rear ends of the associated rooms. A control unit includes a plug-in type connector mounted to a rear crossarm, electric equipments disposed on a mounting plate and two lateral plates interconnected by the crossarm and mounting plate. The control unit is disposed in an associated one of the unit rooms so that the connector extends through the rear plate to connect the electric equipment to associated vertical buses in the bus compartment and the lateral plates have rear ends abutting against the supporting plate and rear plate respectively.

3 Claims, 6 Drawing Figures

CONTROL CENTER HAVING CABINET WITH IMPROVED LATERAL STRENGTH AND SAFETY

BACKGROUND OF THE INVENTION

This invention relates to a control center having a plurality of plug-in type control units stacked in multiple layers therein.

Control centers are frequently of the back-to-back type including a plurality of control units housed on each of the front and rear sides therein. Conventional control centers of the type referred to have comprised a vertical bus compartment disposed in the central portion thereof in which a plurality of vertical buses are disposed, a pair of unit compartments disposed therein with the vertical bus compartments therebetween and the compartments on the front and the rear thereof, a plurality of control units housed in each of the unit compartments and stacked in multiple layers, the control units being supplied with electric powers through the vertical buses respectively, and a vertical wiring compartment disposed adjacent to the lateral side of each unit compartment. Further a cabinet formed of the compartments as described above has included a horizontal bus compartment and a cable entrance compartment disposed on the upper and lower surfaces thereof respectively.

There are already known control units of the type adapted to be housed in each of unit rooms of the unit compartments. One such control unit has comprised a U-shaped unit casing having a pair of opposite lateral plates and a rear plate connected to one another, a front crossarm for connecting front upper corners of the lateral plates, a mounting plate fixed to the inner surface of one of the plates, electric equipment such as a circuit breaker, an electromagnetic switch, a terminal board etc. disposed on the mounting plate and a plug-in type connector disposed on the rear plate to connect the electric equipment to associated vertical buses respectively.

When the control unit is drawn out from an associated one of the unit rooms or when an empty unit room has its door put in the open position, the associated vertical buses are exposed resulting in a danger. In order to avoid this danger, it has previously been the practice to interpose a barrier formed of a synthetic resinous material between the rear surface of each unit casing and the vertical buses. Alternatively, the vertical buses as a whole can be sandwiched between a pair of synthetic resinous covers which also serve to support the vertical buses. In either case it has been required to use expensive resinous products having a high quality resulting in bad economy.

Also the control unit as described above has included a plurality of cables extending into the unit casing through the lower end of one of the lateral plates to the electromagnetic switch and terminal board. In order to prevent the upwardly extending end portions of the cables from being caught by the rear plate of the unit casing upon drawing the control unit out of the associated unit room, the rear plate has been provided at the lower end with a notch through which the cables extend out from the unit casing. However the dimension of the notch has been frequently insufficient because of the size and number of the cables. Thus the cables may be damaged.

In addition, in the control center as described above the cabinet is incapable of being provided on each of the front and rear faces thereof with a reinforcing crossarm or crossarms because such a crossarm or crossarms interferes or interfere with the insertion and removal of the control units into and from the cabinet. This has resulted in the disadvantage that the cabinet is low in lateral strength.

Accordingly it is an object of the present invention to provide a new and improved control center including means for preventing danger due to vertical buses therein without using expensive synthetic resinous products, and having a high lateral strength and from which control units housed in the control center can easily be drawn out.

SUMMARY OF THE INVENTION

The present invention provides a control center comprising a cabinet including a vertical bus compartment disposed in a central portion of the cabinet to divide the same into a front portion and a rear portion, a pair of unit compartments disposed on the front and rear of the bus compartment respectively, and a vertical wiring compartment disposed on the lateral side of each of the unit compartments; a plurality of partition plates for partitioning each of the unit compartments to form a plurality of unit rooms vertically superposed on one another, a plug-in type control unit housed in an associated one of the unit rooms, the plug-in type control unit including a crossarm, a plug-in type connector disposed on the crossarm, a mounting plate having electric equipment mounted thereon, and a pair of opposite lateral plates connected to each other through the crossarm and the mounting plate; a supporting plate disposed in the rear of each of the unit rooms and on each of opposite lateral sides thereof; and a rear plate disposed at the rear end of each of the unit rooms, the rear plate having a width sufficient to close the space between an associated pair of the opposite supporting plates and a height sufficient to cause the upper and lower end thereof to abut against adjacent partition plates respectively, the rear plate further including an opening through which the plug-in type connector extends; the arrangement being so that, when disposed in a final housed position thereof, the control unit has the rear end of each of the lateral plates abutting against a selected one of the supporting plate and the rear plate.

BRIEF DESCRIPTION OF THE DRAWINGS

The present invention will become more readily apparent from the following detailed description taken in conjunction with the accompanying drawings in which.

Throughout the Figures like reference numerals designate identical or corresponding components.

DESCRIPTION OF THE PREFERRED EMBODIMENT

Figure 1:
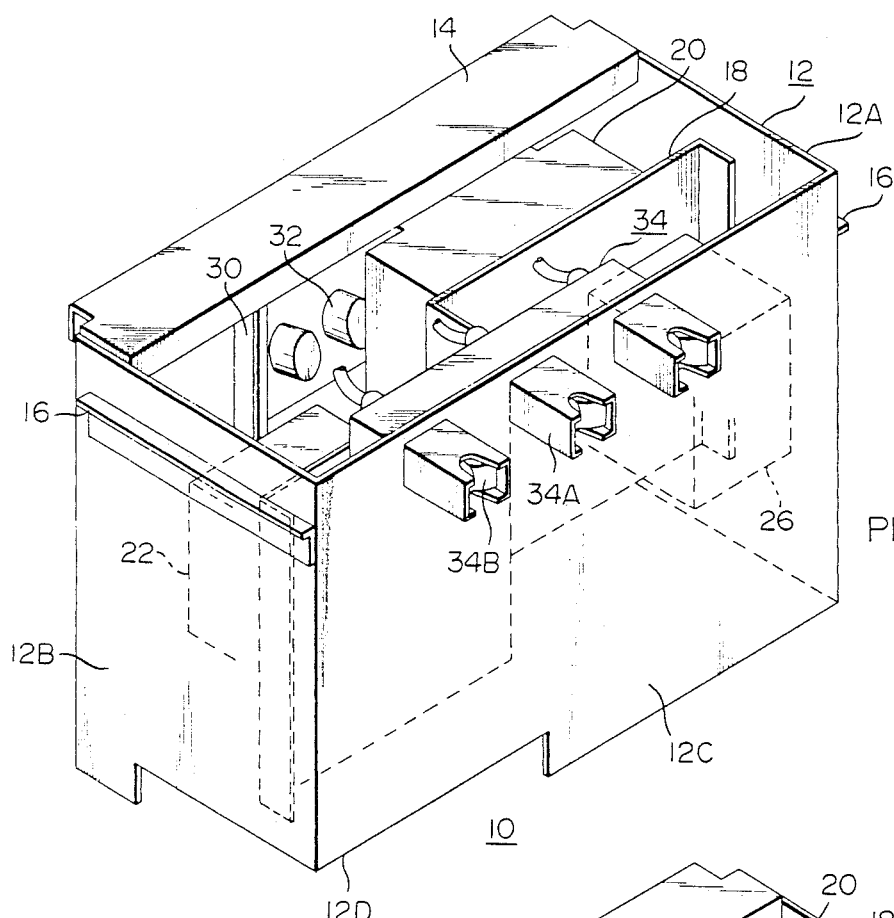
FIG. 1 is a perspective view of a conventional control unit adapted to be housed in a conventional control center as viewed from the rear side of the control unit.

Referring now to FIG. 1 of the drawings, there is illustrated a conventional control unit adapted to be housed in the conventional control center as described above. In the arrangement illustrated the conventional control unit is generally designated by the reference numeral 10 and comprises a U-shaped unit casing generally designated by the reference numeral 12 including a pair of opposite lateral plates 12A and 12B and a rear plate 12C integral with one another with a notch 12D at the lower ends of the lefthand lateral plate 12B as viewed in FIG. 1 and the rear plate 12C adjacent to an edge formed between those plates for a purpose as will be apparent later. The lateral plates 12A and 12B however are called hereinafter a righthand and a lefthand lateral plate respectively only for purposes of explanation. The lateral plates 12A and 12B have a front crossarm 14 extending therebetween on the front upper corners thereof to interconnect them and serve as a drawing grip, and a pair of opposite mounting rails 16 disposed on the upper portions of the outer surfaces thereof respectively substantially parallel to the upper ends thereof. The front crossarm 14 may include a latch (not shown) disposed therein.

A mounting plate 18 is disposed within the unit casing 12 including a vertical bent end connected to the inner surface of the righthand lateral plate 12A, an intermediate flat portion from the vertical bent end extending in spaced parallel relationship with the rear plate 12C and a U-shaped portion having its legs directed toward the rear plate 12C perpendicular thereto and shorter in height than the intermediate flat portion. The mounting plate 18 is provided on the front surface thereof with a circuit breaker 20, an electromagnetic switch 22 and a terminal board (not shown) and on the rear surface of the U-shaped portion facing the rear plate 12C with a control transformer 26 and other electric equipment (not shown). Also control panel 30 is disposed at the front open end of the unit casing 12 and includes an operating handle (not shown) disposed integrally thereon and a plurality of switches 32 two of which are shown only for purposes of illustration.

The rear plate 12C has disposed on the upper portion thereof a plug-in type connector generally designated by the reference numeral 34. The connector 34 includes a plurality of boxlets 34A, in this case, three boxlets protruding from the outer surface of the rear plate 12C to be aligned with one another in a direction parallel to the upper end thereof and open at those ends remote from the rear plate 12C and having U-shaped contacts 34B disposed in the boxlets 34A one for each boxlet and connected to the circuit breaker 20 through respective leads 34C. Each of the contacts 34B is electrically connected to an associated vertical bus (not shown) vertically disposed in a mating control center (not shown) by respectively plugging into the bus.

Also there are known unit casings of the type having electrical equipment such as the circuit breaker 20 and the electromagnetic switch 22 disposed on the inner surface of the rear plate 12C with the mounting plate 18 omitted.

When the conventional control unit 10 as described above is drawn out from an associated unit room within a cabinet of a mating control center (not shown) or when an empty unit room has its door put in the open position, the vertical buses are exposed resulting in a danger. In order to avoid this danger, a barrier formed of any suitable synthetic resinous material has been interposed between the vertical buses and the rear plate of each of the unit casings as disclosed, for example, in Japanese utility model publication No. 56423/1977. Alternatively, the vertical buses as a whole might be sandwiched between a pair of opposite resinous members which serve also as supports for the vertical buses. In either case it has been required to use expensive synthetic resinous products having a high quality.

Also the control unit 10 as described above has included a plurality of cables extending into the unit casing 12 to reach the electromagnetic switch 22 and a terminal board (not shown) disposed therein through the side of the lefthand lateral plate 12B. Thus the notch 12D has been disposed at the lower edges of the lefthand lateral plate 12B and the rear plate 12C as described above in order to prevent end portions of the cables from being caught by the rear plate 12C upon drawing out the control unit from an associated unit room in a mating control center. However the dimension of the notch 12D has been frequently insufficient because of the size and number of cables involved.

Furthermore the cabinet of the control center has been unable to be provided on each of the front and rear faces thereof with a reinforcing crossarm or crossarms because such a crossarm or crossarms interferes or interfere with the insertion of the control units into and removal from an associated control center. This has resulted in the disadvantage that the cabinet is low in lateral strength.

In view of the above described deficiencies, the present invention has been completed which will be subsequently described in conjunction with FIGS. 2 through 6.

Figure 2:
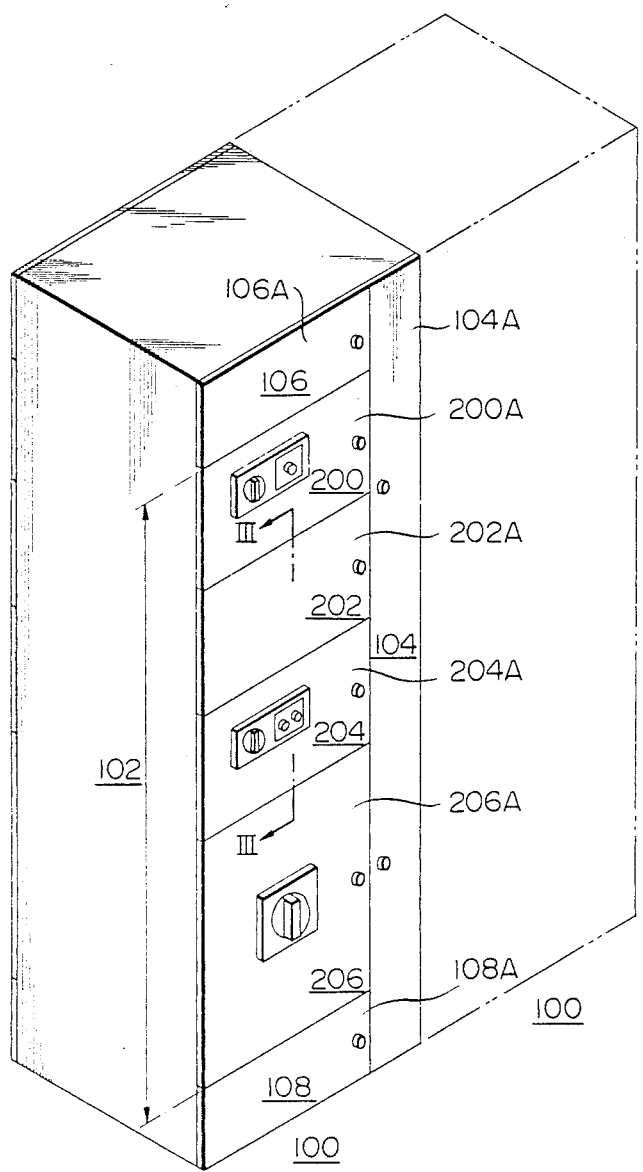
FIG. 2 is a perspective view of one embodiment of the control center according to the present invention.

FIG. 2 shows one embodiment of the control center of the present invention. The present invention comprises generally a plurality of control centers horizontally juxtaposed with one another but FIG. 2 illustrates a pair of control centers horizontally disposed side by side and particularly the details of the lefthand control center as viewed in FIG. 2 because all the control centers are identical to one another. The control center generally designated by the reference numeral 100 comprises a unit compartment generally designated by the reference numeral 102 including a plurality of front unit rooms, in this case, four unit rooms generally designated by the reference numerals 200, 202, 204 and 206 respectively and vertically superposed one above another. A vertical wiring compartment generally designated by the reference numeral 104 is disposed in engagement relationship to the right of stack of the superposed front unit rooms 200, 202, 204 and 206 as viewed in FIG. 2, a horizontal bus compartment generally designated by the reference numeral 106 is disposed in superposed relationship on the uppermost unit room 200 and a cable entering compartment generally designated by the reference numeral 108 is disposed in superposed relationship under the lowermost unit room 206 with the vertical wiring compartment 104 vertically extending therebetween and equal in height to the unit compartment as will be described later. All the unit rooms and the compartments except for the unit compartment 102 include respective doors which are, in turn, designated by those reference numerals identifying the mating unit rooms and compartments with the suffix A. For example, the reference numeral 200A designates the door for the unit room 200.

Because the control center is the back-to-back type, the arrangement 100 has a rear side identical to the front side as shown in FIG. 2. Thus the components on the rear side are designated by those reference numerals identifying the corresponding components on the front side.

Figure 4:
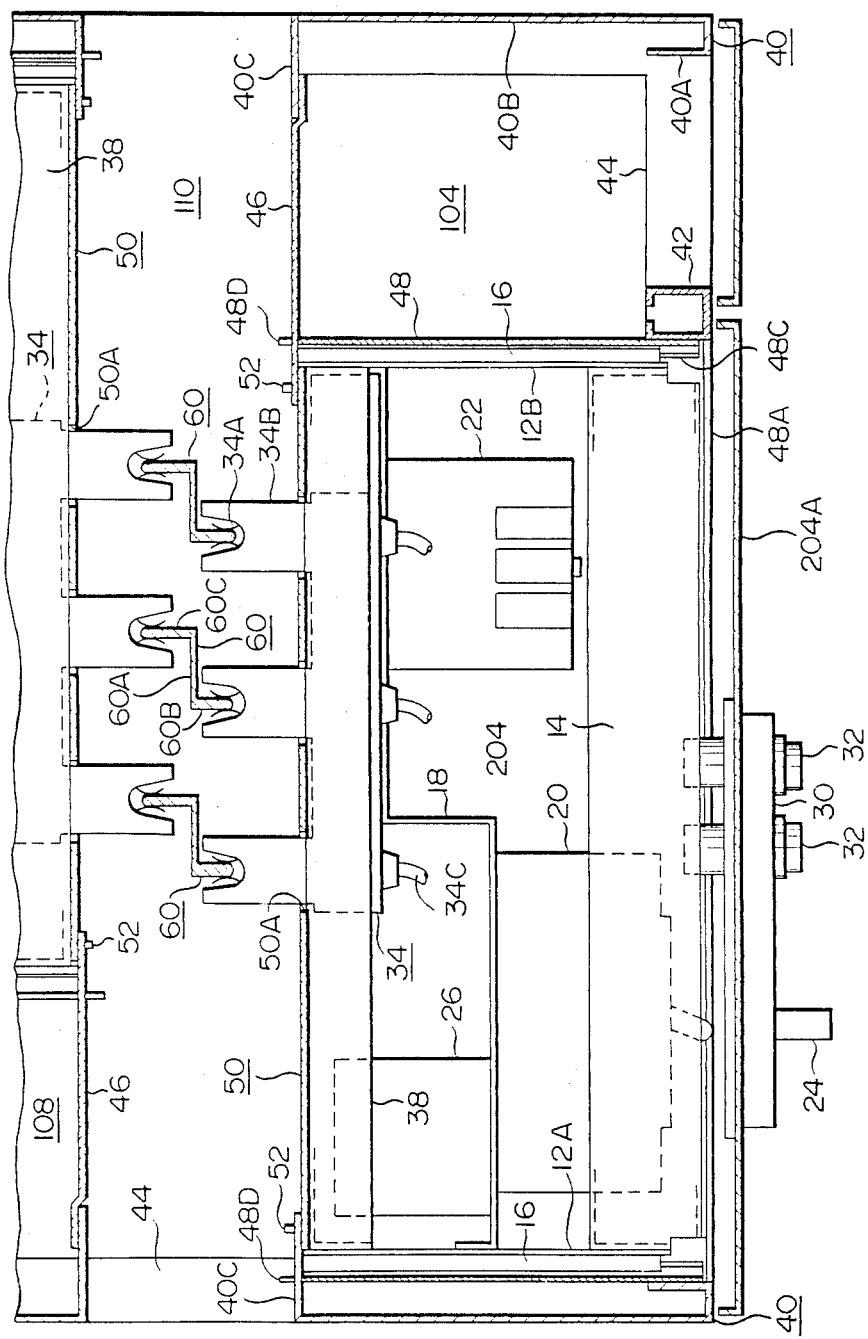
FIG. 4 is a cross sectional view of the arrangement shown in FIG. 3 with the section taken on the line IV—IV of FIG. 3.

Thus a cabinet is formed of all the compartments as described above and includes a pair of opposite vertical wall plates 40 disposed on the opposite lateral sides thereof as viewed in FIG. 4 and an intermediate strut 42 disposed between each of the front and rear unit compartments 102 and the vertical wiring compartment 104. The vertical wall plate 40 includes a U-shaped support leg 40A, an intermediate wall portion 40B and an L-shaped support leg 40C. The vertical wall plates 40 and the intermediate struts 42 are interconnected at the upper and lower ends of the cabinet through a horizontal frame members 44 (see FIG. 4). One of the L-shaped support legs 40C, in the case, the righthand leg as viewed in FIG. 4 is connected to a vertical supporting plate 46 running perpendicularly to the intermediate wall portion 40B to form an extension thereof. The supporting plate 46 separates the vertical wiring compartment 104 from a vertical bus compartment 110.

Figure 3:
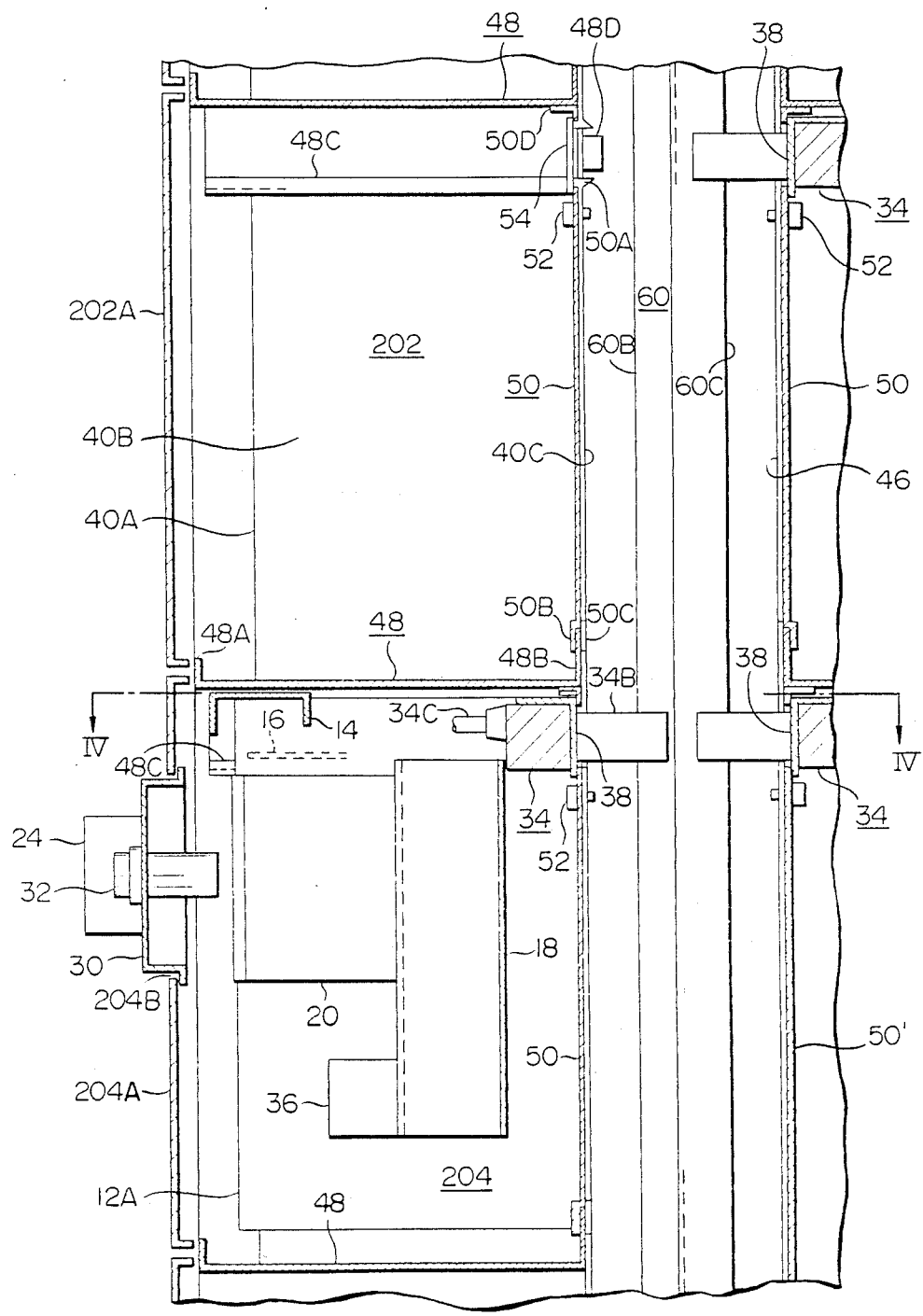
FIG. 3 is a fragmental longitudinal sectional view on a somewhat enlarged scale of the arrangement shown in FIG. 2 with the section taken on the line III—III of FIG. 2.

As seen from the FIG. 3, the unit compartment 102 is divided into the abovementioned unit rooms by a plurality of horizontal partition plates 48. Each of the partition plates 48 has the front and rear ends bent upwards into upwardly extending legs 48A and 48B respectively and both lateral ends bend downward to form a pair of J-shaped guide rails 48C. The partition plate 48 has the front end portion fixed to both the U-shaped support legs 40A and the intermediate strut 42 through the associated J-shaped guide rails 48C and the rear end portion is supported by the L-shaped support leg 40C and the supporting plate 46 by having engagement members 48D protruding from the associated guide rails 48C and rigidly inserted into the leg 40C and the plate 64 respectively (see FIG. 4).

Figure 5:
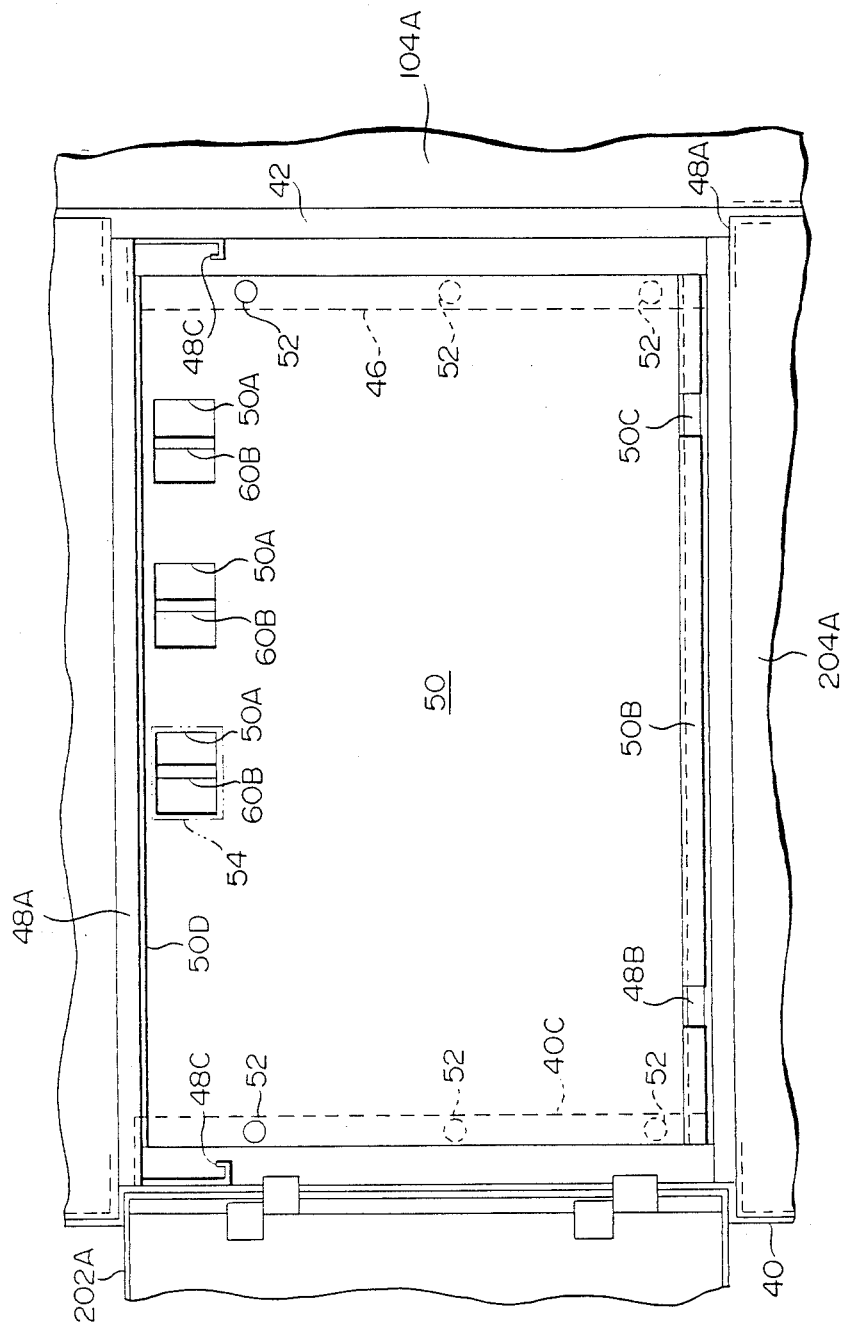
FIG. 5 is a front elevational view of the unit room shown in FIG. 3 with its door in the open position.

A rear plate 50 formed of sheet steel is disposed at the rear end of each of the unit rooms and is provided at the lower end with a step 50B overlapped on the rear upwardly extending leg 48B of the partition plate 48 (see FIGS. 3 and 4). The step 50B is partly cut and folded in the opposite direction to form a clip 50C extending from the main body thereof. In FIG. 5 a pair of spaced clips 50C are shown and have the rear rising leg 48B between them and the main body of the step 50B. As shown in FIGS. 4 and 5, the rear plate includes has righthand and lefthand end portions overlapped on the L-shaped support leg 40C and the supporting plate 46 respectively and fixed thereto by screws 52.

Furthermore the rear plate 50 includes an upper end 50D bent into an L and a plurality of openings 50A, in this case three openings, disposed at predetermined equal intervals thereon for a purpose which will be apparent later. The horizontal leg of the upper L-shaped end of the rear plate 50 abuts against the partition plate 48 defining the upper end of the associated unit room.

From the foregoing it will readily be understood that the rear plate 50 has a width sufficient to close the space formed between the L-shaped support leg 40C and the supporting plate 46 and a height sufficient to cause the upper and lower ends thereof to abut against that partition plate 48 above the rear plate and the short rising leg 48B of that partition plate 48 located under the same. Thus the rear plate 50 has a height substantially equal to that of the mating unit room.

The rear plates 50 as described above are disposed on the rear sides of all the unit rooms including an empty unit room or rooms, one for each room. Thus the rear plates are prepared with different heights as determined by the heights of the associated unit rooms. For example, the reference numeral 50' shown in FIG. 3 designates a separate rear plate different in height from the rear plate 50 as described above.

As shown in FIG. 3, the unit compartments 102 are separated from the vertical bus compartment 110 by the rear plates vertically aligned therewith. A plurality of vertical buses are disposed within the vertical bus compartments 110 each of which is generally designated by the reference numeral 60 and which has a Z-shaped cross section. Each of the vertical buses 60 includes an intermediate section 60A running parallel to the aligned rear plates 50 and front and a rear leg 60B and 60C respectively extending in the opposite directions from both ends of the intermediate section 60A respectively. All the vertical buses 60 are fixed to the L-shaped support legs 40C of the wall plate 40 through an electrical insulation (not shown). As shown in FIG. 5, the front or rear bus leg 60B or 60C can be viewed through an associated one of the openings 50A in the rear plate 50.

Figure 6:
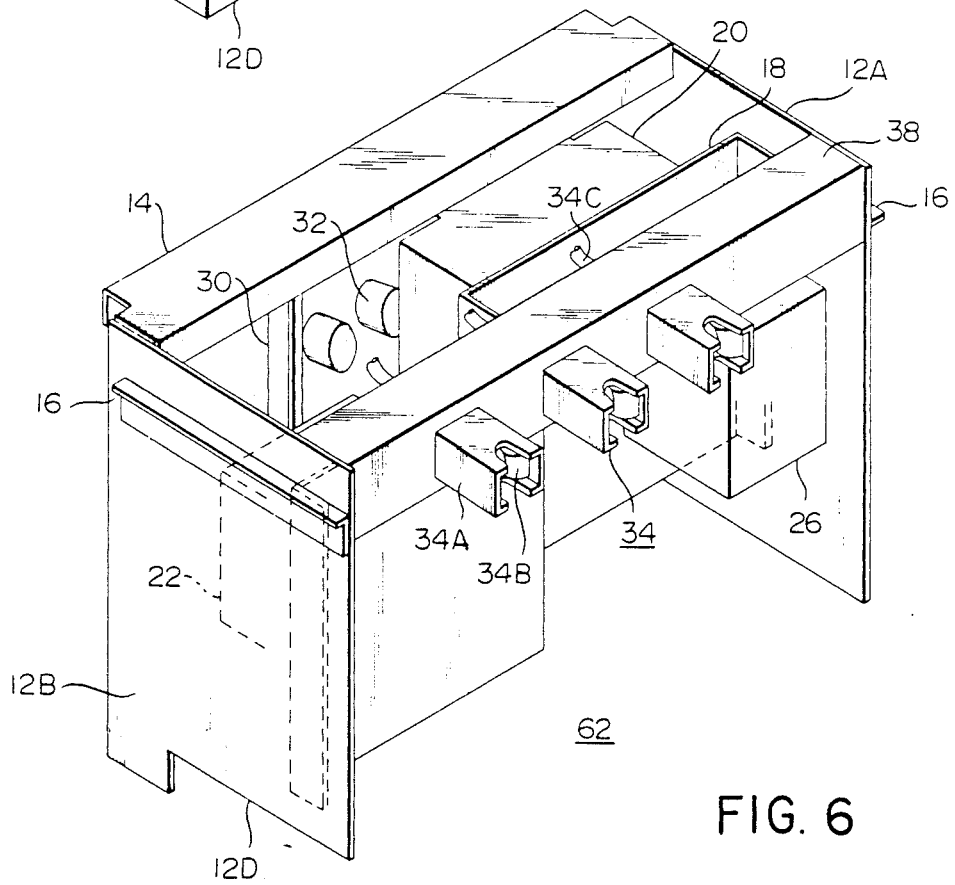
FIG. 6 is a view similar to FIG. 1 but illustrating one embodiment of the control unit of the present invention.

FIG. 6 shows one embodiment of the control unit of the present invention adapted to be housed in the control center as described above. The arrangement illustrated is generally designated by the reference numeral 62 and is different from that shown in FIG. 1 only in that in FIG. 6 the unit casing 12 is formed of a pair of opposite lateral plates 12A and 12B. More specifically the lateral plates 12A and 12B are separately prepared in flat form and interconnected by the front crossarm 14 and the mounting plate 18 as described above and a rear crossarm 38 of an L-shaped cross section sandwiched therebetween on the rear upper corners with the rear plate 12C omitted. The L-shaped crossarm 38 includes an upper or horizontal leg substantially flush with the upper ends of the lateral plates 12A and 12B and an vertical leg somewhat short of the rear vertical ends thereof. On the other hand the front crossarm 14 includes an upper or horizontal surface somewhat raised from the upper ends of the lateral plates 12A and 12B. This is true in the case of the arrangement shown in FIG. 1.

Then the plug-in type connector 34 is mounted on the vertical leg of the L-shaped rear crossarm 16 in the manner as described above in conjunction with FIG. 1.

The control unit 62 is housed in place, for example, within the unit room 204 as shown in FIGS. 3 and 4. As shown, the plug-in type connector 34 has the protruding boxlets 34A extending through the associated openings 50A in the rear plate 50 and the U-shaped contacts 34B are connected to the associated vertical buses 60 by having the legs of each U sandwiching the front or rear leg 60B or 60C of the mating vertical bus 60 therebetween.

On the other hand, a control panel 30 extends out through an opening 204B (see FIG. 3) in the door 204A. The panel 30 being complementary in shape to the opening and includes the operating handle now designated by the reference numeral 24 (see FIG. 3) and a pair of switches 32 protruding from the exposed surface of the control panel 28. The mechanism for the operating handle 24 is not shown in FIG. 3 for purposes of simplicity of illustration.

Also the mounting plate 18 has a terminal board now designated by the reference numeral 36 and disposed adjacent to the lead breaker 20 thereon.

As seen in FIG. 2, those unit rooms having respective control units housed therein are provided in the doors with suitable openings through which the associated control panels extend respectively.

Also the lateral plates 12A and 12B have the rear ends abutting against the U-shaped support leg 40C and the supporting plate 46 respectively. The lateral plate 12B serves to separate the unit room 204 from the vertical wiring compartment 104. As shown in FIG. 4, the mounting plate 18 is located short of the rear ends of the lateral plates 12A and 12B. Thus the mounting plate 18 is located at a predetermined distance from the associated rear plate 50. Also screws 52 fixedly secure the rear plate 50 to the supporting plate 46 or the L-shaped support leg 40C without the head thereof interfering with the mounting plate 18.

The space formed between the mounting plate 18 and the associated rear plate 50 can be utilized for wires or the accommodate electric equipment not requires to be handled.

Also since the rear crossarm 38 is located somewhat lower than the front cross member 14 as described above, thereby to increase the spacing between the same and the bottom of the rear plate 50, the mounting rail 16 can easily ride on the associated guide rails 48C respectively. Also at the final position at which the control unit 62 is housed within an associated one of the unit rooms, in this case, the unit room 204, the leg 50D bent into the L from the rear plate 50 for that unit room will stay above the upper leg of the L-shaped rear crossarm 38. By causing the mating front crossarm 14 to practically abut against the bottom of the partition plate 48 disposed above the unit room 204, the control unit 62 can undergo only limited vertical vibrations during its transportation.

As shown by the dotted circles in FIG. 5, the screws 52 for fixing the rear plate 50 may be any desired number in excess of two. This measure is effective for causing the rear plate 50 to serve as a reinforcing plate for the cabinet in addition to its serving as a barrier or a shield plate. This is because, as seen in FIG. 4 the rear plate 50 is operatively combined with the pair of wall plates 40 so as to make the overall cross section of the cabinet substantially H-shaped resulting in a structure strong in every direction.

In addition, a blanking cover may close any one of the openings 50A in the rear plate 50, in this case, the leftmost opening 50A on the rear plate 50 for the unit room 202 as shown by the broken line 54 in FIG. 5. The purpose of the blanking cover 54 is to prevent a line portion of any vertical bus from being exposed to the unit room 202 when its door 202A is in the open position, for purposes of security.

The control center as described above has the following characteristic features:

(1) In any unit room after an associated control unit has been drawn out therefrom or in any empty unit room, the vertical buses are shielded from such a unit room resulting in freedom from danger. This is because the mounting plate having the electric equipment of the control unit disposed thereon is disposed between a pair of opposite lateral plates so that the same forms an H as viewed in the horizontal direction, and at the final housed position thereof the unit room has its own rear plate located in the rear thereof and fixed to the side of the cabinet for that control unit.

(2) Since the rear plate is located at the same depth as the rear surface of conventional control units, it is ensured that a clearance is sufficiently maintained between the rear plate and the vertical buses. Thus the rear plate can be formed of sheet steel and the use of rear plates of steel is extremely economical as compared with conventional barriers and bus sandwiching covers made of a synthetic resinous material.

(3) The rear steel plates are vertically aligned with one another to separate the unit compartments from the vertical bus compartment. Thus the occurrence of an electric arc in any one of those compartments does not result in the spread of a fire and therefore of an associated fault. Also the electric arc does not deteriorate the electrical insulation.

(4) Because the unit casing does not include a rear plate, no component can catch ends of cables drawn into the unit casing through the notch 12D upon the drawing-out of the control unit. Also with a multi-pole connector connected to the terminal board 36, it has been previously required to draw out the control unit from an associated unit room after the multi-pole connector has been caused to hang down externally in front of that unit room together with the cables. This is because the multi-pole connector is caught by the rear plate 12C of the unit casing. According to the present invention, however, the control unit can be drawn out from the unit room while the multi-pole connector is left on an associated one of the partition plates. Thus the control unit can readily be drawn out from the associated unit room while at the same time the end portions of the cables can be prevented from being damaged by the front upwardly extending leg 48A of the associated partition plate.

(5) With the control unit drawn out from the associated unit room as shown in FIG. 6, the front and rear side thereof are directly accessible. This means that one can extremely easily effect the replacement and maintenance of the electric equipment such as the control transformer 26 disposed on the rear surface of the mounting plate 18 and also the wiring thereto.

(6) The rear plate can serve as a reinforcing member for the cabinet by increasing the number of fixing positions where the rear plate is fixedly secured to the mating members or the supporting plate 46 and the L-shaped support leg 40C of the wall plate 20. Accordingly the control unit can be used with ship and nuclear power plants which are required to have high vibration and quake resistances.

(7) The conventional barrier and bus sandwiching covers formed of a synthetic resinous material have included a plurality of openings for plug-in type connectors, one for each standard dimension of the control unit, resulting in the necessity of covering unnecessary opens with respective blind covers. Thus the number of the blind covers has been large. However, the present invention eliminates the necessity of using many blind covers because one rear plate is provided for each unit room.

(8) Each of the rear plates has the lefthand and righthand ends and the upper and lower ends overlapped on the adjacent portions of the associated supporting and partition plate for the cabinet with no clearance therebetween. This measure ensures that each unit room is well shielded from the vertical bus compartment as compared with the prior art practice.

While the present invention has been illustrated and described in conjunction with a single preferred embodiment thereof it is to be understood that numerous changes and modifications may be resorted to without departing from the spirit and scope of the present invention.

What is claimed is:

1. A control center comprising:

a cabinet having a vertical bus compartment disposed in the central portion of said cabinet and dividing said cabinet into a front portion and a rear portion, a pair of unit compartments disposed in said front and rear portions respectively, and a vertical wiring compartment disposed beside each of said unit compartments, a plurality of horizontal partition plates spaced vertically from each other in each of said unit compartments for partitioning each of said unit compartments into a plurality of unit rooms vertically superposed one above another, a pair of supporting plates at the rear of each of said unit rooms adjacent said vertical bus compartment and on each of the opposite lateral sides thereof and spaced laterally from each other, and a rear sheet metal plate disposed in the rear of each of said unit rooms and connected between said supporting plates and closing the space between said supporting plates and between adjacent ones of said partition plates, respectively, said rear plate further including at least one opening for allowing a plug-in type connector to extend therethrough;

a plurality of plug-in type control units, each housed in an associated unit room, each plug-in type control unit including spaced opposed lateral plates and a crossarm connected between the upper corners of said lateral plates which, when the unit is housed in a corresponding unit room, is toward said vertical bus compartment, the remainder of the space between the edges of said lateral plates which are toward said vertical bus compartment being open, at least one plug-in type connector on said crossarm, and a mounting plate connected to said lateral plates and having electric equipment mounted thereon, said edges of said lateral plates, when the unit is housed in a corresponding unit room, abutting a corresponding supporting plate and rear plate.

2. A control center as claimed in claim 1 in which each rear plate has at least two screws at each lateral end connecting said rear plate to said supporting plates.

3. A control center as claimed in claim 1 in which said mounting plate is at a predetermined distance from the said edges of said lateral plates.

* * * * *